United States Patent
Gu et al.

(10) Patent No.: US 8,790,445 B2
(45) Date of Patent: Jul. 29, 2014

(54) APPROACHES FOR REMOVING $CO_2$, $SO_2$ AND OTHER GASEOUS CONTAMINATES FROM GAS EMISSIONS

(75) Inventors: Alex Gu, Plymouth, MN (US); Wei Yang, Minnetonka, MN (US); Tariq Samad, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 542 days.

(21) Appl. No.: 12/785,925

(22) Filed: May 24, 2010

(65) Prior Publication Data

US 2010/0300286 A1   Dec. 2, 2010

Related U.S. Application Data

(60) Provisional application No. 61/217,716, filed on Jun. 2, 2009.

(51) Int. Cl.
*B03C 3/14* (2006.01)

(52) U.S. Cl.
USPC .......... 95/71; 95/29; 95/236; 95/235

(58) Field of Classification Search
CPC ............ B03C 3/017; B03C 3/383; B03C 3/14
USPC ............ 95/29, 64–67, 71, 236; 96/27, 52, 53, 96/74, 389; 261/81, 115, 117, 118
See application file for complete search history.

(56) References Cited

U.S. PATENT DOCUMENTS

| | | | | |
|---|---|---|---|---|
| 3,958,959 A | * | 5/1976 | Cohen et al. | 95/64 |
| 4,095,962 A | * | 6/1978 | Richards | 95/65 |
| 6,156,098 A | * | 12/2000 | Richards | 95/65 |
| 6,579,343 B2 | * | 6/2003 | Brennecke et al. | 95/51 |
| 6,656,253 B2 | * | 12/2003 | Willey et al. | 96/27 |
| 7,160,391 B2 | * | 1/2007 | Willey et al. | 118/629 |
| 7,459,011 B2 | * | 12/2008 | Cadours et al. | 95/178 |
| 7,531,027 B2 | * | 5/2009 | Tepper et al. | 96/27 |

(Continued)

FOREIGN PATENT DOCUMENTS

WO     WO 2008/122030     * 10/2008

OTHER PUBLICATIONS

Tepper, G., et al., "A New Air Sampler based on Electrically Charged Liquid Nanodroplets", Sixth IEEE Conference on Nanotechnology (IEEE—NANO 2006), (2006), pp. 781-782.*

*Primary Examiner* — Duane Smith
*Assistant Examiner* — Sonji Turner
(74) *Attorney, Agent, or Firm* — Seager, Tufte, Wickhem LLC

(57) ABSTRACT

Air scrubbers and approaches for removing $CO_2$, $SO_2$, and other gaseous contaminates from gas emissions. An approach for removing a gaseous contaminant from a gas emission may include providing a supply of an ionic liquid. The gaseous contaminant may be absorbable in the ionic liquid. The approach may also include spraying the ionic liquid into the gas emission. The gaseous contaminant in the gas emission may be absorbed in the ionic liquid. The ionic liquid having the gaseous contaminant absorbed therein may be collected on a counter electrode and separated from the gas emission. Spraying the ionic liquid into a gas emission may include ultrasound agitation of the ionic liquid. The approach may also include venting the gas emission having the gaseous contaminant separated therefrom.

19 Claims, 3 Drawing Sheets

(56) References Cited

U.S. PATENT DOCUMENTS

| | | | |
|---|---|---|---|
| 8,241,397 B2* | 8/2012 | Gu et al. | 95/71 |
| 8,313,558 B2* | 11/2012 | Shiflett et al. | 95/64 |
| 2006/0081178 A1* | 4/2006 | Willey et al. | 118/621 |
| 2006/0185511 A1* | 8/2006 | Tepper | 95/71 |
| 2008/0074662 A1 | 3/2008 | Gu et al. | |
| 2008/0121106 A1* | 5/2008 | Tepper et al. | 96/27 |
| 2008/0138265 A1* | 6/2008 | Lackner et al. | 423/224 |
| 2009/0114090 A1 | 5/2009 | Gu et al. | |
| 2009/0148930 A1* | 6/2009 | Gal et al. | 435/264 |
| 2009/0235817 A1* | 9/2009 | Gu et al. | 95/79 |
| 2009/0272897 A1 | 11/2009 | Fedorov et al. | |
| 2009/0291874 A1* | 11/2009 | Bara et al. | 510/175 |

* cited by examiner

US 8,790,445 B2

APPROACHES FOR REMOVING $CO_2$, $SO_2$ AND OTHER GASEOUS CONTAMINATES FROM GAS EMISSIONS

This application claims the benefit of U.S. Provisional Patent Application No. 61/217,716, filed on Jun. 2, 2009, under 35 U.S.C. §119(e). U.S. Provisional Patent Application No. 61/217,716, filed on Jun. 2, 2009, is hereby incorporated by reference.

TECHNICAL FIELD

The present application pertains to air scrubbers and approaches for using the same. More particularly, the present application pertains to approaches for removing $CO_2$, $SO_2$, or other gaseous contaminants from gas emissions.

BACKGROUND $CO_2$ and other emissions from human activities may be of concern. Flue gas emissions from power plants are often noted. Thus, there appears to be a need to provide alternative technologies and approaches for capturing and sequestering $CO_2$ and other contaminates from gas emissions including flue gas emissions from power plants.

BRIEF SUMMARY

The disclosure provides example approaches for removing a gaseous contaminant (e.g., $CO_2$, $SO_2$, etc.) from gas emissions. An example approach for removing a gaseous contaminant or contaminant from a gas emission may include providing a supply of an ionic liquid. The gaseous contaminant may be absorbable in the ionic liquid. The approach may also include spraying the ionic liquid into the gas emission. The gaseous contaminant in the gas emission may be absorbed in the ionic liquid. The ionic liquid having the gaseous contaminant absorbed therein may be collected on a counter electrode and separated from the gas emission. Spraying the ionic liquid into a gas emission may include ultrasound agitation of the ionic liquid. The approach may also include venting the gas emission having the gaseous contaminant separated therefrom.

An example approach for removing $CO_2$ from a flue gas emission of a power plant may include providing a supply of an ionic liquid and electrospraying fine liquid droplets of the ionic liquid into the flue gas emission. $CO_2$ from the flue gas emission may be absorbed in the ionic liquid. The approach may also include capturing the ionic liquid having $CO_2$ absorbed therein on a counter electrode to remove $CO_2$ from the flue gas emission. Electrospraying the ionic liquid into the flue gas emission may include ultrasound agitation of the ionic liquid. The approach may also include venting the flue gas emission having $CO_2$ removed therefrom.

Another example approach for removing $CO_2$ from a flue gas emission of a power plant may include providing a supply of an ionic liquid. $CO_2$ may be absorbable in the ionic liquid. The approach may also include electrospraying fine liquid droplets of the ionic liquid into the flue gas emission. $CO_2$ from the flue gas emission may be absorbed in the ionic liquid. Electrospraying the ionic liquid into the flue gas emission may include ultrasound agitation of the ionic liquid. The approach may also include capturing the ionic liquid having $CO_2$ absorbed therein on a counter electrode to remove $CO_2$ from the flue gas emission, venting the flue gas emission having $CO_2$ removed therefrom, desportion of $CO_2$ from the ionic liquid, and recycling the ionic liquid having $CO_2$ removed therefrom into the supply of ionic liquid.

The above summary of some examples is not intended to describe each disclosed example or every implementation of the present invention. The Figures, and Detailed Description, which follow, more particularly exemplify these illustrative examples.

BRIEF DESCRIPTION OF THE DRAWINGS

The invention may be more completely understood in consideration of the following detailed description of various examples of the invention in connection with the accompanying drawings, in which.

Figure 1:
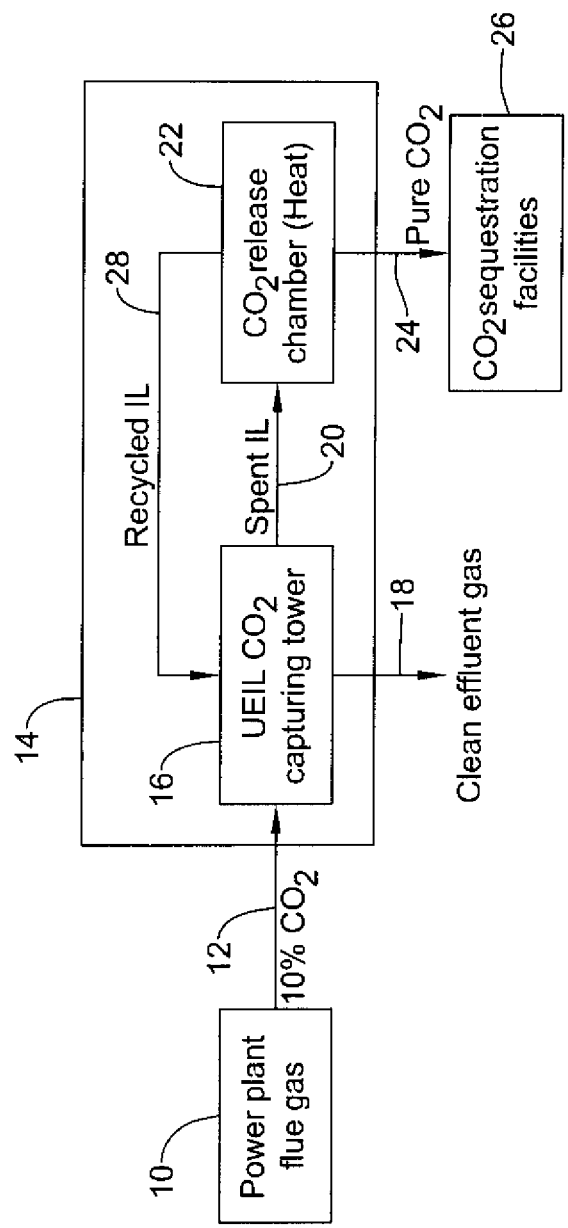
FIG. 1 is a schematic overview of an example process for removing a gaseous contaminant from a gas emission.

While the invention is amenable to various modifications and alternative forms, specifics thereof have been shown by way of example in the drawings and will be described in detail. It should be understood, however, that the intention is not to limit the invention to the particular examples described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative examples and are not intended to limit the scope of the invention.

Gas emissions from a number of sources including power plants may be of particular concern due to the amount of $CO_2$ contained therein that may be released into the atmosphere. Because of this, a number of air scrubbers and/or methods for removing contaminants from gas emissions have been developed that are aimed at reducing $CO_2$ and/or other gas emissions, for example, from power plants. The present disclosure pertains to methods for reducing the concentration of and/or removing one or more gaseous contaminants (e.g., $CO_2$, $SO_2$, combinations thereof, and so forth) from gas emissions such as flue gas emissions from power plants. The methods disclosed herein may be advantageous over other methods for a number of reasons including, for example, lower voltage and/or power requirements, reduction or elimination of ozone or plasma production, reduction in the loss of the contaminant-collecting material through evaporation and/or decomposition, ease of physical integration into existing systems (e.g., power plants), lower start-up and/or operating costs, as well as other advantages. Some additional details regarding some of these and other advantages are discussed in more detail below.

FIG. 1 is a schematic overview of an example process for removing or otherwise reducing the overall concentration of a gaseous contaminant 12 from a gas emission 10. In this example, gas emission 10 is a flue gas emission from a power plant. However, in other examples, gas emission 10 may be from another source. The flue gas emission 10 may include a gaseous contaminant 12 that is targeted for removal from gas emission 10. In this example, gaseous contaminant 12 is $CO_2$. This, however, is not intended to be limiting as one or more alternative or additional contaminates may also be present in gas emission 10 such as $SO_2$.

A scrubbing apparatus or system 14 may be used to remove gaseous contaminate 12 from gas emission 10. For the purposes of illustration, FIG. 1 shows gaseous contaminant 12 entering or otherwise passing through scrubbing apparatus 14. In practice, however, the entire gas emission 10 (having gaseous contaminant 12 disposed therein) may pass through scrubbing apparatus 14 so that gaseous contaminant 12 can be removed from gas emission 10. Scrubbing apparatus 14 may include a capturing component 16 that may be used to capture gaseous contaminant 12. As described in more detail below, this capturing component 16 of apparatus 14 may utilize ultrasound-assisted electrospray (UEIL) technology and include one or more sprayers or spraying assemblies that spray (e.g., electrospray) an ionic liquid into gas emission 10. The sprayers may be disposed along a pipe, chimney, or tower where gas emission 10 and gaseous contaminant 12 pass. The ionic liquid sprayed by the sprayers may absorb gaseous contaminant 12 so that gaseous contaminant 12 can be contained and, ultimately, removed from gas emission 10. Once gaseous contaminant 12 is removed, clean effluent gas may be vented along pathway 18.

The ionic liquid having gaseous contaminant 12 absorbed therein (e.g., "spent IL") may proceed along pathway 20 to a second or collection portion 22 of scrubbing apparatus 14. Here, gaseous contaminant 12 can be released from the ionic liquid (e.g., through the application of heat, vacuum, microwave, combinations thereof, or other means which may release $CO_2$ from the ionic liquid) and follow pathway 24 to a sequestration and/or collection tank or facility 26. Having removed gaseous contaminant 12 therefrom, the ionic liquid may be recycled back along pathway 28 to the supply of ionic liquid utilized at capturing component 16 of apparatus 14, where it may be reused to further capture and remove gaseous contaminant 12 from gas emission 10.

As indicated above, the example methods for removing gaseous contaminant 12 from gas emission 10 include the use of an ionic fluid or liquid that is sprayed (e.g., electrosprayed) into the flue gas emissions of a power plant. The ionic liquids may be specially designed organic salts that are liquids at room temperature and that absorb the desired target contaminate so that the contaminate can be removed from the gas emission. Typically, the target contaminant is $CO_2$ or $SO_2$, but other contaminates may also be targeted.

Some examples of ionic liquids that may be utilized are represented by the following general formulas:

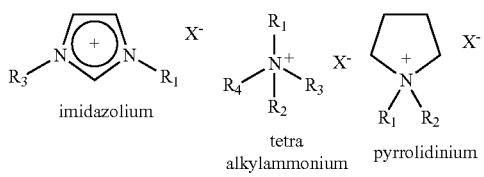

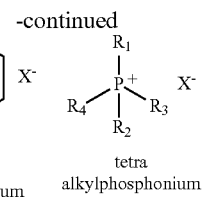

$X^- = Cl, NO_3, CH_3CO_2, CF_3CO_2, BF_4, CF_3SO_3, PF_6, (CF_3SO_2)_2N$

In general, it can be seen that the ionic liquids include a cation and an anion, whose forces of attraction are not sufficiently strong to hold them together as a solid at ambient temperature. These salts are therefore, liquids. This property may allow them to dissolve organic compounds and serve as potential solvents for industrially important organic reactions.

In at least some examples, the cations may be nitrogen-based organic cations. For example, cations may include an imidazolium, pyridinium, alkylammonium, alkylphosphonium, pyrrolidinium, or other cations having alkyl groups (e.g., $R_1$, $R_2$, $R_3$, and $R_4$) in the $C_2$ to $C_8$ range. The anions ($X^-$) may be inorganic anions. For example, the anions may include generally small inorganic species such as $Cl^-$, $CH_3CO_2^-$, $CF_3CO_2^-$, $CF_3SO_3^-$, $(CF_3SO_2)_2N^-$, $[BF_4]^-$, $[PF_6]^-$, triflate $[TfO]CF_3SO_2^-$, nonaflate $[NfO]CF_3(CF_2)_3SO_2^-$, bistrifluoromethane sulfonimide $[Tf_2N]$ $(CF_3SO_2)_2N^-$, trifluoroacetate $[TA]CF_3CO_2^-$, heptafluorobutanoate $[HB]CF_3(CF_2)_3CO_2^-$, $[NO_3]^-$, or other anions. Some specific examples of ionic liquids may include, but are not limited to, trimethylphenylammonium bistrifluoride, 1,3-butylmethylpyrrolidinium bistriflamide, 1,3-butylmethylimidazolium bistriflamide, 1,3-ethylmethylimidazolium bistriflamide, 1,3-ethylmethylpyrrolidinium bistriflamide, 1,3-trihexyltetradecanephosphonium bistriflate, butylmethylimidazolium hexafluorophosphate, butylmethylimidazolium tetrafluoroborate, ethylmethylimidazolium bis(trifluoromethanesulfonyl)amide, ethylmethylimidazolium trifluoromethanesulfone, ethylmethylimidazolium dicyanamide, 1-butyl-3-methylimidazolium chloride, 1-butylpyridinum chloride, or the like, or a combination thereof. Other ionic liquids may also be used.

A number of ionic liquids may have desirable $CO_2/SO_2$ absorption/desorption characteristics. For example, some example ionic liquids such as those derived from amino acids may absorb up to about 50% (mol/mol) $CO_2$ at room temperature and release $CO_2$ at a slightly elevated temperature (e.g., about 60° C.). This may occur with little or no deterioration of the ionic liquid over repeated absorption/desorption cycles. Other ionic liquids may have similar and/or desirable properties.

One example ionic liquid (1,3-HMIM[$TF_2S$]) that may be utilized may have the following properties listed in Table 1:

TABLE 1

Properties of 1,3-HMIM[$TF_2S$]

| IL Properties | Value |
|---|---|
| Vapor pressure at 298 K | ~$10^{-12}$ Torr |
| Decomposition temperature | >200° C. |
| Viscosity at 25° C. | 0.078 Pa·s |
| Surface tension at 25° C. | 0.0356 N/m |
| Self diffusion constant at 25° C. | $2.54 \times 10^{-7}$ cm²/sec |
| Molecular weight | 447.42 g/mol |
| Thermal conductivity | 0.127 W/m/K |
| Heat Capacity | 583 J/K/mol |

In this example, the ionic liquid has a virtually undetectable vapor pressure, is thermally stable up to about 200° C., and has low surface tension. In addition, the capture capacity of ionic liquids may compare favorable to conventional CO2 capturing media.

Ionic liquids may also represent a low cost solution to removing gaseous contaminant 12. For example, several ionic liquids are commercially available in bulk at a relatively low cost. Because the ionic liquid may be reused/recycled and the total loss to evaporation may be very low, the use of an ionic liquid may represent a "one time purchase" to the end user and, due to bulk availability, may represent a small fraction of the total cost to a power plant.

As indicated above, losses of ionic liquids are relatively low and may come primarily from evaporation. Table 2 summarizes the estimated evaporational loss of ionic liquid for a typical 500 MW power plant.

TABLE 2

Estimated evaporational loss of ionic liquid for a typical 500 MW power plant.

| Entries | Value |
|---|---|
| $CO_2$ emission (metric ton) | About $4 \times 10^6$ |
| Flue gas $CO_2$ concentration (%) | 10% |
| Flue gas volumetric flow (L/yr) | $2 \times 10^{13}$ |
| Ionic liquid vapor pressure at 50° C. (torr) | $10^{-11}$ |
| Estimated evaporational loss (gram/yr) | 4.9 |

It can be seen that an estimated 4.9 grams per year of the ionic liquid are lost per year. Given that the total amount of ionic liquid utilized in a 500 MW power plant may be on the order of several hundred thousand pounds (e.g., about 800,000 pounds), this loss is negligible.

Ionic liquids may be considered environmentally friendly because they have essentially no detectable vapor pressure and they are also non-flammable. The extremely low vapor pressures (and negligible losses to evaporation) throughout a wide temperature range and wide array of solvating properties make ionic liquids an ideal industrial solvent replacement for volatile organic compounds (VOCs). In addition, most ionic liquids are electrochemically inert between −4 and +4 volts. This inertness and their low electrical resistance allows for recycling of the ionic liquids by electrochemically reducing or oxidizing the captured gaseous contaminants.

Figure 2:
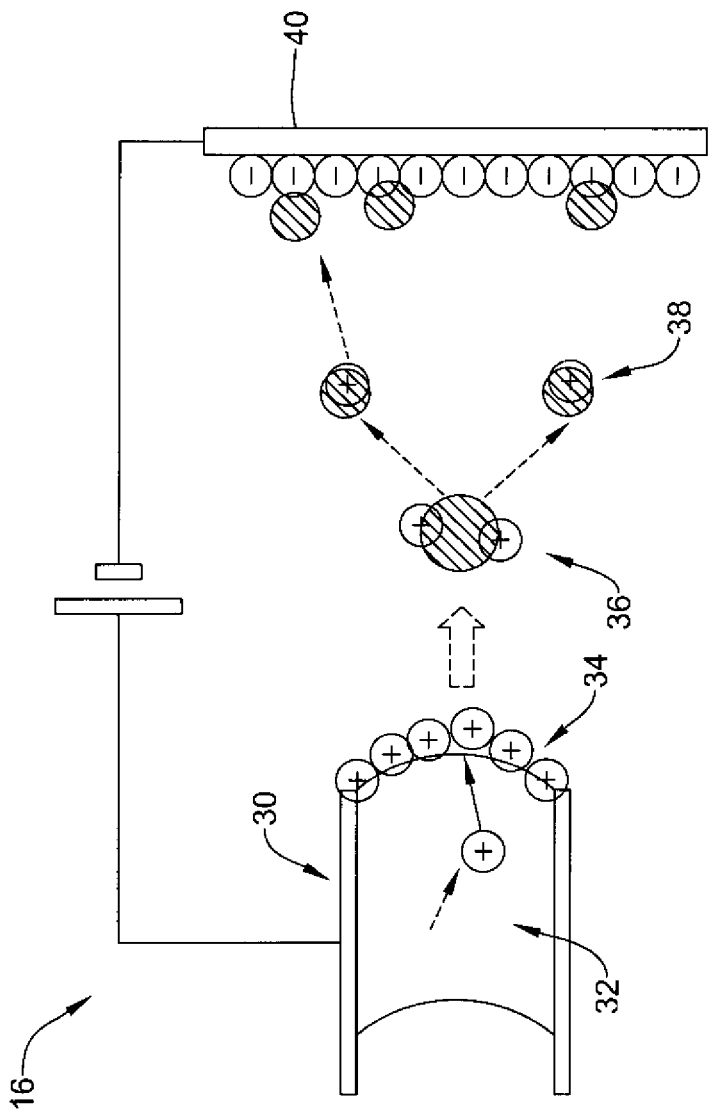
FIG. 2 is a schematic illustrating a capturing component of an example spraying apparatus.

FIG. 2 is a schematic that further illustrates the capturing component 16 of spraying apparatus 14. Here, it can be seen that capturing component 16 may include a spray nozzle 30. Spray nozzle 30 may also be termed an electrospray nozzle, for example, because a voltage may be applied thereto. In this example, a singular nozzle 30 is shown. However, in practice a plurality of nozzles 30 may be utilized. For example, a spraying assembly or array may be used that includes one or more 20 by 20 arrays of nozzles 30 (e.g., on one or more 2 cm×2 cm×3 mm plates). A variety of different arrangements and/or numbers of spray nozzles 30 may also be utilized that differ in the number of nozzles 30 and/or the arrangement thereof.

The ionic liquid, shown generally at reference number 32, may be disposed or otherwise passed through nozzle 30. This may also schematically represent a supply of ionic liquid 32 provided, for example, at nozzle 30. Upon reaching the end 34 of nozzle 30, which may have an accumulation of charge (in this example positive charge) due to voltage being applied thereacross, ionic liquid 32 may become charged. Thus, as a primary droplet 36 of ionic liquid 32 is released from nozzle 30, droplet 36 may bear this charge. The primary droplet 36 may or may not split into one or more secondary droplets 38, which may also bear the charge. Droplets 36/38 may be relatively small in size. For example, droplets 36/38 may be on the order of about 0.1 to hundreds of microns, or about 0.1 to about 100 microns.

It can be appreciated that nozzle 30 may spray a relatively large plume of spray droplets 36/38. This may be desirable for a number of reasons. For example, the relatively large number of droplets may increase the surface area for capturing gaseous contaminant 12 (e.g., up to about 1,000 $m^2/g$). In addition, a relatively large number of droplets 36/38 in a flow stream from nozzle 30 may reduce the effective diffusion length for gaseous contaminant 12. Furthermore, the relatively high surface to volume ratio of droplets 36/38 may allow for faster dissolution of gaseous contaminant 12 into ionic liquid 32. For example, gaseous contaminant 12 may be captured by ionic liquid 32 on the order of about 1-10 μs (e.g., 5 μs) whereas other systems may capture the gas contaminant on the order of minutes. Thus, electrospraying may provide a number of desirable benefits.

The droplets 36/38 of ionic liquid 32 may then be collected at a counter electrode 40, which also may have a voltage applied across and may bear the opposite charge (in this example negative charge). This may be desirable for a number of reasons. For example, counter electrode 40 may tend to attract and hold the charged ionic liquid droplets 36/38 (which may have gaseous contaminant 12 absorbed therein). This may help to sequester gaseous contaminant 12 as well as help to preserve ionic liquid 32 and keep it from being lost to the environment. The captured ionic liquid droplets 36/38 having gaseous contaminant 12 absorbed therein may have gaseous contaminant 12 removed therefrom and may be recycled back into the supply of ionic liquid 32 as indicated above. Thus, capturing component 16 is designed so prevent the loss of ionic fluid 32 to the environment and to recycle ionic fluid 32 across a vast number of cycles.

As indicated above, in at least some illustrative examples, the electrosprayers and/or electrospraying apparatus used to spray the ionic liquid 32 may be ultrasound-assisted. In other words, the process of electrospraying may include the use of ultrasound energy to agitate and/or disperse the ionic liquid 32 out from the spray head(s) of the sprayer or spraying apparatus. This may include the use of sprayers similar to those disclosed in U.S. Patent Application Pub. No. US 2009/0272897, the entire disclosure of which is herein incorporated by reference.

Figure 3:
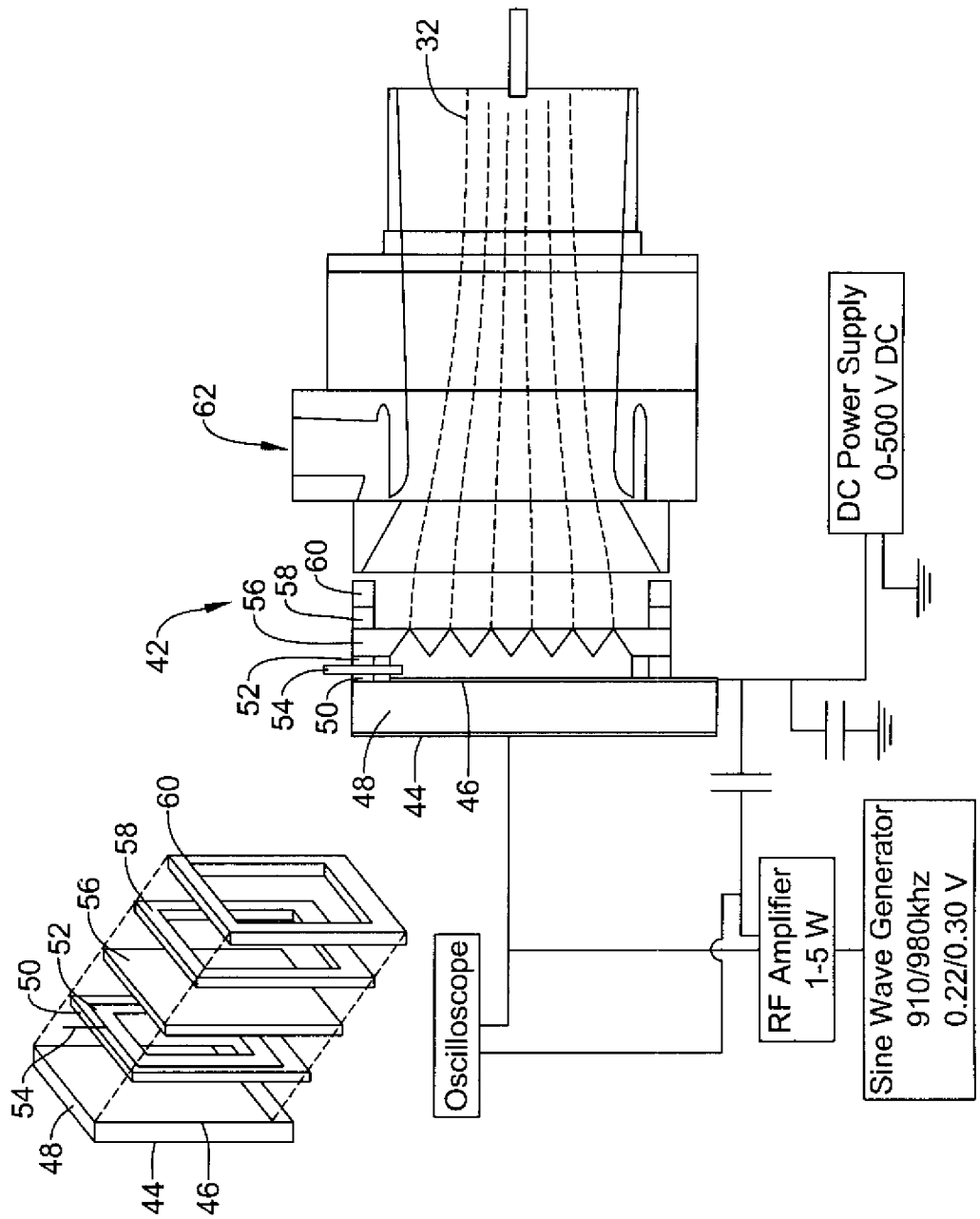
FIG. 3 is a schematic side view of an example electrospraying apparatus.

FIG. 3 is a schematic view of an ultrasound-assisted electrosprayer 42 which may be used to remove gaseous contaminant 12. As such, electrosprayer 42 may be used as the sprayer for ionic fluid 32 as described above with reference to FIGS. 1-2. In general, electrosprayer 42 uses ultrasound energy to agitate and spray ionic liquid 32. In addition to being shown with electrosprayer 42, some of the portions or layers that may be included with ultrasound-assisted electrosprayer 42 are shown separately apart from electrosprayer 42. This is for clarity purposes.

The precise arrangement and/or configuration of electrosprayer 42 may vary and may include a variety of different structural components. For example, electrosprayer 42 may have a pair of electrodes 44/46 having a piezoelectric material 48 disposed therebetween. One or more spacers 50/52 (e.g., made from kapton material, silicone, or any other suitable material) may be disposed on opposite sides of ionic liquid inlet 54. A silicone array 56 may be disposed adjacent to a silicone spacer 58 and a brass spacer 60. In use, a compressed gas may be passed through an inlet 62 while ionic fluid 32 is passed through inlet 54, and is ultimately sprayed from ultrasound-assisted electrosprayer 42. These are just examples.

FIG. 3 also illustrates some additional electrical components of electrosprayer 42. For example, electrosprayer 42 may include a power supply (in this example a DC power source) and a sine wave generator along with an RF amplifier for producing ultrasonic energy. An oscilloscope may also be coupled to electrosprayer 42 for monitoring potential across the system. These components are shown for illustrative purposes and variation to the particular electrical set up may be varied.

The use of ultrasound-assisted electrospraying may be desirable over conventional microspraying for a number of reasons. For example, conventional microspraying may have a relatively high voltage and/or power consumption. This may increase costs at, for example, a power plant. The use of ultrasound-assisted electrosprayer 42 may greatly reduce the voltage and/or power requirements. For example, a spray voltage as low as 100V with liquid droplets as small as 3 μm is possible. Thus, the use of ultrasound-assisted electrosprayer 42 can result in a significant reduction in costs. In addition, the use of ultrasound-assisted electrosprayer 42 does not produce ozone or plasma, may utilize a larger diameter sprayer that may be less likely to plug, and/or have other desirable advantages.

The following example is provided for illustration purposes. Essentially, the power requirements for ultrasound-assisted electrosprayer 42 may come from ultrasound agitation, electrospraying, pumping of gaseous contaminant 12 between the capturing and releasing portions, and the heat required to release gaseous contaminant 12 from ionic liquid 32. For ejecting about 5 ml/min of a spray with about 5 μm droplets at about a 20 m/s ejection velocity, the input power may be less than about 0.1 W. If it is assumed that about 50% (mol %) $CO_2$ may be captured by the ionic liquid 32, the ultrasound power consumption may be about 11 MW for a 500 MW power plant. The power consumption of ultrasound-assisted electrosprayer 42 is believed to be much lower than that of the ultrasound due to low current (e.g., on the order of μA) even when the applied DC voltage is significant. Using the same spray rate and a spray voltage of 100V and a spray current of 100 μA, it is estimated that the total power consumption of ultrasound-assisted electrosprayer 42 may be about 1 MW.

In sum, for a 500 MW power plant, process simulations according to NETL guidelines have shown that for high enthalpy ionic liquid $CO_2$ reactions, a total equivalent work of about 91 MW may be required for $CO_2$ capture, about 62.3 MW may be required for releasing $CO_2$ and/or regenerating the ionic liquid, about 5 MW may be required for pumping, and about 23.6 MW may be required for $CO_2$ compression and transport. This may compare favorably to other conventional techniques utilized in the art. A comparison of $CO_2$ capturing and sequestration power consumption between the ultrasound-assisted electrospraying of the ionic liquid to other techniques such as ionic liquid drop-in and monoethanolamine (MEA) is shown in Table 3.

TABLE 3

Comparison of $CO_2$ capturing and sequestration power consumption between the ultrasound-assisted electrospraying of the ionic liquid (UEIL) to other techniques such as ionic liquid drop-in (IL Drop-In) and monoethanolamine (MEA)

| Power Consumption | UEIL | IL Drop-In | MEA |
|---|---|---|---|
| Ionic Liquid regeneration (MW) | 62 | 62 | 50 |
| Ultrasound (MW) | 11 | — | — |
| Electrospray (MW) | 1 | — | — |
| Pumping (MW) | 5 | 25 | 45 |
| $CO_2$ Compression (MW) | 24 | 24 | 40 |
| Total Power Required (MW): | 103 | 111 | 135 |

Table 3 illustrates that ultrasound-assisted electrospraying of an ionic liquid may represent about a 30% energy savings as compared to MEA technology and about an 8% energy savings compared to an ionic liquid drop-in.

This application may be relevant to U.S. Patent Application Pub. Nos. US 2009/0235817 and US 2009/0114090, the entire disclosures of which are herein incorporated by reference.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A method for removing at least partially one or more gaseous contaminants from a gas emission, the method comprising:

providing a supply of an ionic liquid, the ionic liquid comprising an organic salt, wherein a gaseous contaminant is absorbable in the ionic liquid;

spraying the ionic liquid into the gas emission, wherein the gaseous contaminant in the gas emission is absorbed in the ionic liquid, and wherein the ionic liquid having the gaseous contaminant absorbed therein is collected on a counter electrode and separated from the gas emission;

wherein spraying the ionic liquid into a gas emission comprises ultrasound agitation of the ionic liquid; and venting the gas emission having the gaseous contaminant separated therefrom.

2. The method of claim 1, wherein the ionic liquid includes one or more of an imidazolium, a pyridinium, a tetra alkylammonium, a tetra alkylphosphonium, and a pyrrolidinium.

3. The method of claim 1, wherein the gaseous contaminant includes $CO_2$.

4. The method of claim 1, wherein the gaseous contaminant includes $SO_2$.

5. The method of claim 1, wherein spraying the ionic liquid into a gas emission comprises electrospraying fine liquid droplets of the ionic liquid into the gas emission.

6. The method of claim 5, wherein the fine liquid droplets have a diameter of about 0.1 to 100 micrometers.

7. The method of claim 1, wherein spraying the ionic liquid into a gas emission comprises charging the ionic liquid.

8. The method of claim 1, further comprising removing the gaseous contaminant from the ionic liquid.

9. The method of claim 8, wherein removing the gaseous contaminant from the ionic liquid comprises the application of heat, vacuum, microwave energy, or combinations thereof.

10. The method of claim 8, further comprising containing the removed gaseous contaminant.

11. The method of claim 8, further comprising recycling the ionic liquid having the gaseous contaminant removed therefrom into the ionic liquid.

12. A method for removing $CO_2$ from a flue gas emission of a power plant, the method comprising:

providing a supply of an ionic liquid, the ionic liquid comprising an organic salt;

electrospraying fine liquid droplets of the ionic liquid into the flue gas emission, wherein $CO_2$ from the flue gas emission is absorbed in the ionic liquid;

wherein electrospraying the ionic liquid into the flue gas emission comprises ultrasound agitation of the ionic liquid;

capturing the ionic liquid having $CO_2$ absorbed therein on a counter electrode to remove $CO_2$ from the flue gas emission; and venting the flue gas emission having $CO_2$ removed therefrom.

13. The method of claim 12, wherein the ionic liquid includes one or more of an imidazolium, a pyridinium, a tetra alkylammonium, a tetra alkylphosphonium, and a pyrrolidinium.

14. The method of claim 12, wherein the fine liquid droplets have a diameter of about 0.1 to 100 micrometers.

15. The method of claim 12, wherein spraying the ionic liquid into a gas emission comprises charging the ionic liquid.

16. The method of claim 12, further comprising removing $CO_2$ from the ionic liquid.

17. The method of claim 16, wherein removing $CO_2$ comprises heating.

18. The method of claim 16, further comprising containing the removed $CO_2$.

19. The method of claim 16, further comprising recycling the ionic liquid having $CO_2$ removed therefrom into the supply of the ionic liquid.

\* \* \* \* \*